United States Patent [19]

Halsup et al.

[11] Patent Number: 5,571,416
[45] Date of Patent: Nov. 5, 1996

[54] CONTINUOUS DRAIN FOR SOLIDS SEPARATED BY A CENTRIFUGAL SEPARATOR

[75] Inventors: Lee Halsup, Dunwoody, Ga.; Phil Pelletier, Bel Air, Md.

[73] Assignee: Claude Laval Corporation, Fresno, Calif.

[21] Appl. No.: 472,703

[22] Filed: Jun. 6, 1995

[51] Int. Cl.$^6$ .................................... B01D 21/26
[52] U.S. Cl. .................. 210/512.1; 210/788; 210/532.1; 210/533; 209/715; 209/720; 209/725; 209/733; 137/177
[58] Field of Search ................................ 210/512.1, 787, 210/788, 512.2, 532.1, 533; 55/459.1, 459.2, 459.3, 459.4, 459.5, 344; 209/715, 716, 719, 720, 725, 730, 733; 137/177

[56] References Cited

U.S. PATENT DOCUMENTS

| 2,603,309 | 7/1952 | Mercier et al. | 55/344 |
| 3,017,767 | 1/1962 | Mossberg | 210/512.1 |
| 5,078,549 | 1/1992 | Schweiss et al. | 210/512.1 |
| 5,368,735 | 11/1994 | Ford | 210/512.1 |

*Primary Examiner*—David A. Reifsnyder
*Attorney, Agent, or Firm*—Donald D. Mon

[57] ABSTRACT

A centrifugal liquid/solids separator includes a cylindrical separation chamber into which a liquid/solid mixture is tangentially introduced. At least some of the solids separate and migrate to a lower collection chamber. A drain port from the collection chamber passes a thikened liquid/solid mixture. A drain conduit from the drain port has parameters such that the mixture fills the conduit and continuously passes through it at a velocity sufficient to prevent settling of solids in it and free-flowing of liquid through it.

3 Claims, 1 Drawing Sheet

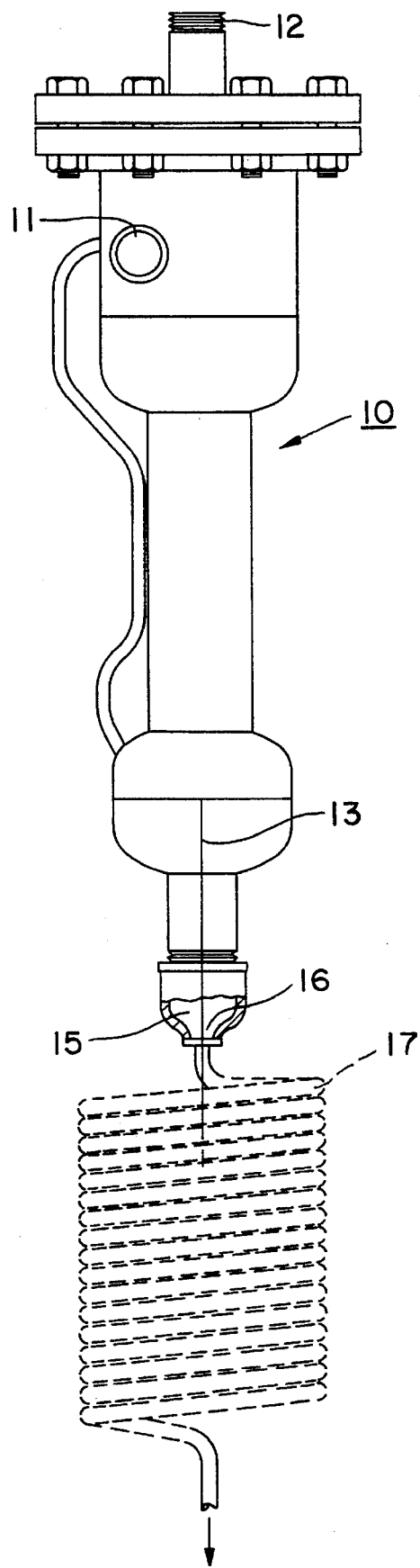

CONTINUOUS DRAIN FOR SOLIDS SEPARATED BY A CENTRIFUGAL SEPARATOR

FIELD OF THE INVENTION

Continuous drainage of solids that have been separated from a liquid/solids mixture by a centrifugal separator. The drain is an always-open drain conduit of such length and frictional properties that flow from the drain conduit of solids in a collection chamber from which the drainage conduit continuously purges the solids and some liquids.

BACKGROUND OF THE INVENTION

Centrifugal separators for separating solids from liquids are well-known. They are used in irrigation systems to remove sand and debris from irrigation streams, to remove particles cleaned from parts in a parts-cleaning system, and scale and grindings from metal-working systems, to name only a few examples. A family of such separators is exemplified by the showing in Steven D. Ford U.S. Pat. No. 5,368,735.

Separators of this type provide a cylindrical separation chamber into which a stream of liquid (usually water) is injected. The stream carries entrained solids such as sand, grit, metal particles, and debris. This stream is injected into the separation chamber with a substantial tangential velocity. The stream flows helically downward to a spin plate, where it reverses its direction and flows centrally upward to exit the separation chamber at its top.

Because the entrained solids are denser than the liquid, they migrate closer to the wall of the chamber. Near the spin plate at least some of the solids continue to move downwardly and radially out through an exit port instead of flowing upwardly with the exiting liquid. It is customary to let the separated solids settle in a lower collection chamber, and then periodically to purge the collection chamber, along with a burden of liquid.

This is more than a nuisance, because if the collection chamber is not drained frequently enough, the collection chamber will be filled with solids. The separator is then incapacitated even though it continues to pass the liquid stream. Even occasional drainage through a stopcock valve entails this risk because of the risks of unobserved additional burden or of neglect. The supervision and inherent inefficiency and wastefulness of this arrangement is well-known.

It is an object of this invention to provide a drain for the solids which is always open, but which permits the flow of solids through it at a rate that is consistent with the accumulation of solids in the collection chamber. When properly designed, the drain conduit permits the steady passage of a thickened stream with a minimal discharge of liquid with the solids. This prevents accumulation of solids in the collection chamber and with minimized liquid loss. Periodically, lost liquid will be replaced, if in a closed system. The system need not be shut down to remove the solids, and loss of fluid is less than for conventional drainage.

This invention provides some rather unpredictable and surprising results. When the drain conduit is provided, it actually increases the separation efficiency of the entire system, because by continuously removing the solids it encourages the smaller particles to enter the collection chamber (sometimes called a "purge chamber") past the spin plate, and are less likely to be carried along in the effluent mainstream.

Also, and especially when the drain conduit is formed in the shape of a coil, which reduces its height relative to its length, the tendency of the contents of the conduit is to remain as a rather more consistent mix, with the solids dispersed evenly through the length of the tube. This is a significant advantage when the system is shut down, because a solid plug is less likely to be formed. When one uses a shut off valve to control the purging, a solid plug is likelier to form after the drain port is closed, and this can make a plug which must later be removed. This invention does not involve this difficulty.

BRIEF DESCRIPTION OF THE INVENTION

A centrifugal separator according to this invention incorporates a separation chamber with an internal cylindrical wall. A liquid stream with a burden of solids is injected tangentially into the separation chamber. It flows at a rapid velocity around and along the wall, and during this time the solids move toward the wall. A spin plate is disposed near the lower end of the wall.

The liquid impinges on the spin plate, reverses its direction of spin, and flows to the upper end of the separation chamber in a flow path which is functionally separate from the entering mixture.

The solids continue their flow adjacent to the wall, past the spin plate, and enter a lower collection chamber. The solids will accumulate in the collection chamber. Excess liquid will back up into the separation chamber and re-enter the general flow stream in a continuous flow pattern.

According to this invention, a drain port is provided at a lower point in the collection chamber. A drain conduit is attached to the drain port, both of which are always open.

The length, cross-section, and frictional properties of the drain conduit are selected such that it will pass the thickened mixture (thickened in the sense of a reduced water content), from the collection chamber at a steady rate, but only at a rate such that the mixture remains in the conduit as a continuously-extending and moving plug. This prevents the free flow of liquid, which of course could undesirably drain the collection chamber without limitation.

According to a preferred but optional feature of this invention, the drain conduit is formed as a coil, thereby reducing its flow head relative to its length of path.

The above and other features of the invention will be fully understood from the following detailed description and accompanying drawings, in which:

BRIEF DESCRIPTION OF THE DRAWINGS

FIG. 1 is a side view of the presently-preferred embodiment of the invention.

DETAILED DESCRIPTION OF THE INVENTION

A centrifugal separator 10 is shown in FIG. 1. This separator is fully disclosed in U.S. Pat. No. 5,368,735, issued Nov. 29, 1994, which is incorporated by reference here in its entirety for the details of construction of a suitable separator for use with this invention.

The separator receives a liquid/solid stream through inlet port 11, and discharges the liquid portion (along with some solids that may not have been removed) through outlet port 12. The separator has a central axis 13.

The injected stream flows tangentially around the inside cylindrical wall of a separation chamber, striking a spin plate. The whirling stream reverses its direction and flows upwardly to the outlet port.

Of importance to this invention, a collection chamber 15 is disposed near the bottom of the separator, below the spin plate. Here the separated solids settle, along with some liquid. It is the object of this invention to purge the separator of these solids through a drain port 16.

The drain port discharges to a drain conduit 17. The drain port and the drain conduit are always open to flow, so that it is not necessary to provide a valve or a plug for the drain port that would require attention. The purging action is continuous.

The arrangement must be such that solids will not settle out in the drain conduit where it might shut it completely, or be so rapid that excessive liquid is drawn out, which in a closed system would require too much replenishment. It is intended that the thickened mixture be discharged into a receiver such as a 55 gallon drum or a dumpster, for example. It is often useful to minimize the amount of liquid discharged in this manner.

The length of the drain conduit provides the required friction loss that will limit the flow rate of the stream. Consider the garden hose. If one length of hose is connected to a faucet with a given pressure head, a given amount of water will flow from the hose. If one continues to add lengths of hose, a lesser flow, then soon a uselessly slow flow, and then even no flow, will result.

In this invention the major parameters are the specific gravity of the solids, the velocity required to prevent the solids from settling out in the drain conduit, and the friction factor of the drain conduit itself.

As a rule of thumb, it has been found that the velocity of flow, expressed in feet per second should be numerically at least twice the specific gravity of the solids. Thus for sand with a specific gravity of between about 2.4 and 2,8, the diameter and length of the hose, based on a known pressure head in the separator, would be between about 4.8 and about 5.6 feet per second.

A suitable material for the drain conduit is a ⅜ inch inside diameter polypropylene hose. It is useful in the above example for pressures up to about 40 psi, and especially between about 30–40 psi.

The inside diameter of the hose is advantageously kept as small as possible. Smaller hoses have a higher resistance to flow, and pass the smallest amount of water at the required velocity. The practical minimum diameter is related to the size of the largest particle expected to be separated and the volume of solids expected to be separated.

In practice, it is convenient to start with a 50 foot length of hose of proper diameter, start the system, and then cut the hose to a length where the correct flow results.

It is advantageous to form the drain conduit as a vertical coil as shown in FIG. 1. This decreases the head height for the same flow length, and facilitates gradual flow through the entire length without separation of the solids from the liquid. This greatly decreases the risk of forming a solid plug, especially when the system is shut down for a time.

This invention is not to be limited by the embodiment shown in the drawings and described in the description, which is given by way of example and not of limitation, but only in accordance with the scope of the appended claims.

I claim:

1. In a separator for separating solids from a mixture of solids and liquids, said separator having a cylindrical separation chamber into which said mixture is tangentially introduced, and from which at least some of said solids migrate to a lower collection chamber, said chamber having a drain port through which said solids, accompanied by some of said liquid are to be purged, said solids having a specific gravity, the improvement comprising:

a drain conduit connected to said drain port to receive a thickened mixture of solids and liquid, said conduit having parameters of friction factor, dimension of inside diameter, and dimension of length, said parameters being selected such that said thickened mixture completely fills said drain conduit, continuously passing through said conduit at a velocity sufficient to prevent settling of solids in said conduit as could prevent flow through said conduit, sufficient to prevent such velocity as would enable free-flowing liquid to pass through such conduit, and said diameter being sufficiently larger than the largest expected size of solids as to enable passage of said solids.

2. Apparatus according to claim 1 in which said parameters are selected so that said velocity as numerically expressed in feet per second is numerically equal to about twice the numerical value of the specific gravity of the solids being purged.

3. Apparatus according to claim 1 in which said drain conduit is a coil.

\* \* \* \* \*